United States Patent [19]

Bach, Jr. et al.

[11] 3,760,271

[45] Sept. 18, 1973

[54] MICROWAVE SURVEY METER

[75] Inventors: Stanley Monrad Bach, Jr., Hopkins; Leonard S. Smith, Minneapolis; Reed E. Holaday, Minnetonka, all of Minn.

[73] Assignee: Holaday Industries, Inc., Hopkins, Minn.

[22] Filed: June 7, 1971

[21] Appl. No.: 150,372

[52] U.S. Cl.................. 324/95, 324/72.5, 325/363, 343/703
[51] Int. Cl........................ G01r 21/04, G01r 31/02
[58] Field of Search.................... 324/95, 72.5, 149; 250/39; 325/67, 363; 343/703

[56] References Cited
UNITED STATES PATENTS

| 3,641,439 | 2/1972 | Aslan | 325/363 |
| 2,991,417 | 7/1961 | Papp | 325/67 |
| 3,147,439 | 9/1964 | Eakin | 325/67 |
| 3,238,529 | 3/1966 | Bock | 324/95 X |
| 3,360,726 | 12/1967 | Peters, Jr. | 324/95 X |

Primary Examiner—Rudolph V. Rolinec
Assistant Examiner—Ernest F. Karlsen
Attorney—Donald L. Andersen

[57] ABSTRACT

A device to measure low level near field microwave power density, such as leakage from a microwave appliance. A radial array of semiconductor diodes functions both as an antenna and a detector. The dc current generated in the array by an electric field causes a voltage drop across a load resistance. The voltage drop is a function of electric field strength and is measured by a sensitive dc voltmeter calibrated in power density. A switching sequence in the device provides both an internal battery check and an operational test of the diode array before the device is utilized to measure a microwave field.

6 Claims, 3 Drawing Figures

Patented Sept. 18, 1973

INVENTORS
STANLEY MONRAD BACH, JR.
LEONARD S. SMITH
REED E. HOLADAY

BY Donald L. Andersen

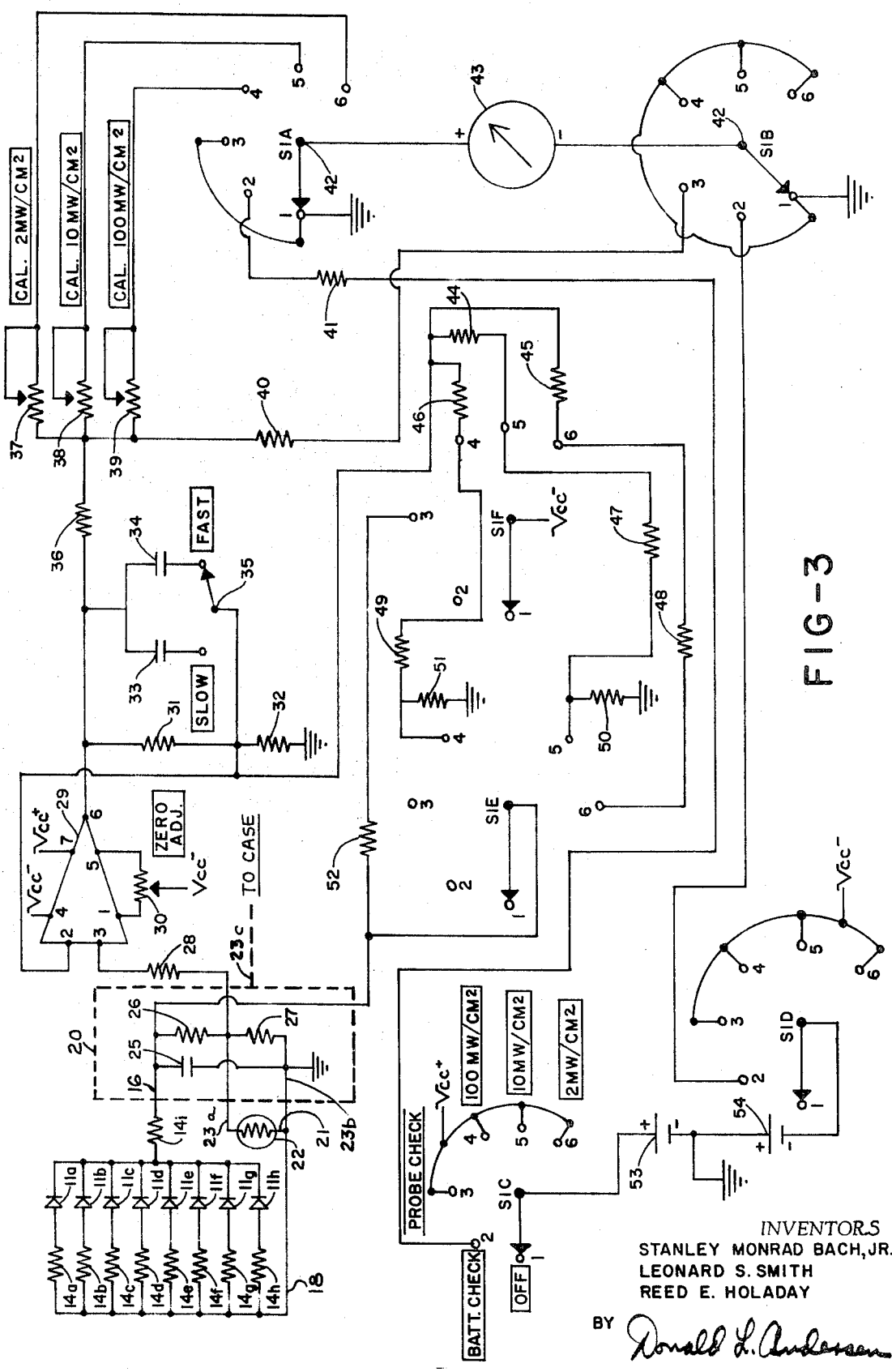

MICROWAVE SURVEY METER

The present invention relates to an improved instrument to detect and measure microwave power density. More particularly, the invention concerns a survey meter designed to measure low level near field microwave power density, such as leakage from microwave ovens and diathermy machines.

Microwave energy is a feasible power source in many industrial and consumer applications. Industry forecasts indicate that the number of microwave devices in use will grow markedly in the next decade, particularly with regard to restaurant or home microwave ovens. Essentially all microwave devices are designed for operation within a completely shielded enclosure with no access while the microwave source is generating power. However, there is almost always some microwave leakage to the outside from such devices. The concern about the biological hazards of microwave leakage necessitates effective detection and quantification of microwave power density in the immediate vicinity of operating microwave devices.

Instrumentation to detect microwave leakage is generally either laboratory (highly sophisticated, designed for experimentation) or survey (portable, relatively simple and inexpensive, and designed to measure low level microwave leakage under actual use conditions). In addition, methods of detection can be divided into thermal and electrical.

Thermal detectors utilize the principle of a measurable electrical or physical change in a thermally sensitive element caused by the propagating RF field. Conventional means of measuring this electrical or physical change are then utilized and are calibrated in microwave power density to read power density directly. Thermal detection methods generally have the common deficiency of being ambient temperature dependent and requiring fairly sophisticated compensation circuitry.

Prior art devices for detection of microwave leakage by electrical means (direct electrical energy conversion) employ the principle of a semiconductor diode (rectifier). Detected RF power generates an alternating RF current and the diode rectifies this current to dc current which can then be measured using conventional circuitry. These prior art devices generally utilized a diode/dipole antenna configuration or crossed diodes/dipoles.

The detector systems of the prior art exhibit additional drawbacks in that even moderate RF signal strengths must be greatly attenuated before reaching the detector in order not to overload it; such attenuation circuitry is often rather complicated and may lead to quantitative inaccuracies; in addition the use of a dipole antenna, crossed dipole antennas, or slot radiators or antennas rendered the device relatively sensitive to field polarization and generally unable to accurately measure complex microwave fields.

However, prior to the passage of the Regulations for Administration and Enforcement of Radiation Control for Health and Safety Act of 1968, "Title 42 Public Health—Chapter 1, Subchapter F, Part 78," the need for truly accurate near field measurement and read-out of these complex microwave fields was not as acute. The more effective devices of the prior art have relied on antenna elements of one configuration of another, although usually short dipole elements, to convert the propagating incident RF wave into RF currents and it is these currents that are "detected" and the output of the detector is then measured against a field power density calibrated standard.

Utilization of antenna elements as part of a survey probe generates a number of problems associated with antennas in general — reradiation and resultant field perturbation; a high degree of directional sensitivity; polarization problems; and the problems of the optimum design and configuration.

Even the more effective prior art devices to detect and measure microwave power density in the near field regions have been less than completely satisfactory for a variety of other reasons. Cost versus performance — instruments capable of higher performance are relatively expensive and as such fail to satisfy the existing demand for a moderately priced device for routine servicing of microwave appliances. Accuracy — prior art devices are stated to have accuracies of the order of ± 25 percent, even in the commonly used ranges. Drift — thermal detector devices commonly exhibit substantial drift. Overload sensitivity — many thermal detector devices are subject to probe failure or irreversible loss of accuracy at moderate overloads. Repairability — complex circuitry of most prior art devices necessitates bench calibration and precludes field or service shop maintenance or repair. Internal continuity check — prior art devices generally do not provide adequate internal meter and probe checking capability; probe and meter are checked essentially on the basis only of electrical continuity, not on functional or operational integrity.

It is therefore an object of the present invention to provide an improved microwave survey meter overcoming the above and other shortcomings of prior art devices. Specifically, it is an object to provide a microwave survey meter which combines the antenna, attenuation, and detector functions in a single simple configuration without any separate antenna elements and which provides quantitative measurement of microwave field power density essentially independent of ambient temperature, free of bothersome zero drift, with improved accuracy in the ranges used, without the need for complex signal attenuating circuitry, with improved insensitivity to field polarization and capable of accurately summing and reading-out the resultant power density from complex microwave near fields, and capable of exposure to microwave fields several times greater than the indicated upper range of the instrument without burn-out.

A microwave survey meter demonstrating objects and advantages of the present invention is a device for indicating low level microwave power density. It is designed to detect microwave leakage eminating from microwave ovens, diathermy machines, etc., which may be in excess of present Department of Health, Education, and Welfare standards. It is calibrated in terms of power density. A discussion of this calibration technique can be found in the Health, Education, and Welfare Department publication, "Near Field Instrumentation" (BRH/DEP 70-16, dated July, 1970).

The device comprises: a probe, wherein a radial array of semiconductor diodes connected in parallel act as an antenna (generates RF current through interaction with the propagating RF field), as an attenuator, and as a detector (rectifies the RF current to dc current); and a readout means. In the near field region, the probe responds to the electric field component of the microwave energy essentially independent of the polarization of the field and causes a minimum perturbation of the field when as close as 5 cm. to the source. The probe is essentially unaffected by the operator when hand held. The detection means employed makes the device much less prone to overload damage than prior art devices of similar function.

The readout means consists of a dequential function switch, amplification and integration mean, and a suitably calibrated meter. The switching sequence provides for automatically checking both the batteries and the detector probe before each use.

The above brief description, as well as further objects and advantages of the present invention, will be more fully appreciated by reference to the following detailed description of a presently preferred, but nevertheless purely illustrative, embodiment of a microwave survey meter in accordance with the present invention, when read in conjunction with the accompanying drawings, wherein:

FIG. 3 is a schematic view of one presently preferred version of the electrical circuitry illustrative of the present invention, including such readout means as might be used in the measurement of the generated dc current from the detection probe embodiment depicted in FIG. 1 or another embodiment of the detection probe of the microwave survey meter hereof.

Figure 1:
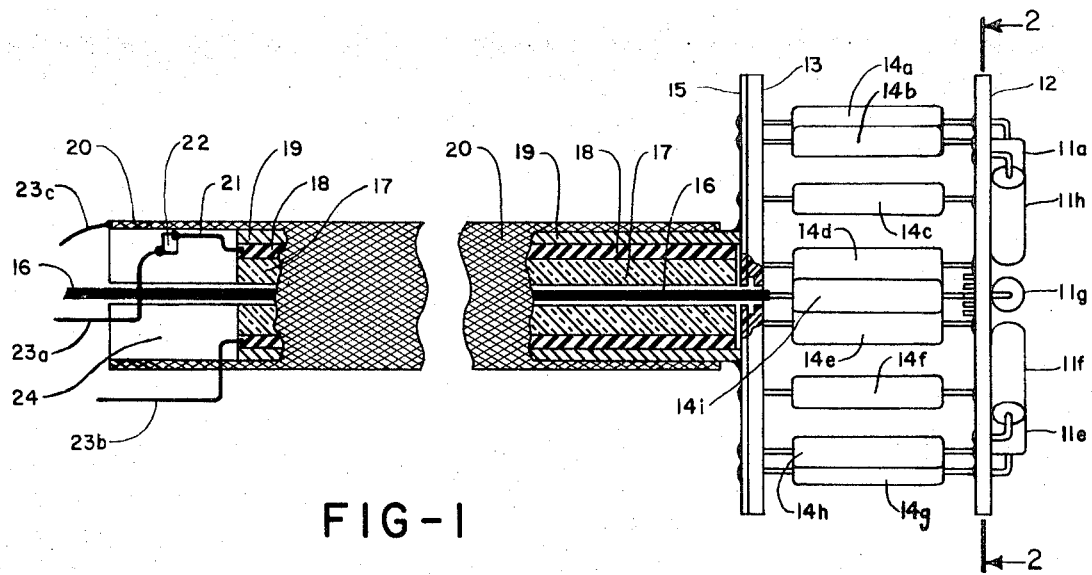
FIG. 1 is a cross-sectional cutaway view of a detection probe illustrative of the present invention.

In FIG. 1 a cutaway view of a probe assembly illustrative of a receiving, attenuating, and detecting embodiment of the present invention: a radial array of eight diodes 11a through 11h (for example, non-linear, hot carrier, epitazial, planar, passivated diodes such as manufactured by hewlett-Packard) is mounted on a circuit board 12 so that each diode forms essentially a spoke of a wheel with the cathode lead of each diode electrically connected to one lead of resistor 14i positioned at right angles to the plane of said diode array, other lead of said resistor 14i being connected to the solid metallic center conduction 16. Each anode lead of each diode is connected to one lead of each of eight resistors 14a through 14h positioned at right angles to the plane of said diode array and parallel to said resistor 14i, the opposite leads of said eight resistors 14a through 14h being electrically contiguous each to the other by means of an electrical connection of each to a ground plane consisting of a metallic plate 15 fastened to a second circuit board 13 and insulated from said center conductor 16 which passes through an insulated hole in the center of said ground plane 15. Electrically connected to said ground plane 15 and concentrically positioned around said center conductor 16 is a tubular metallic outer conductor 18, electrically connected to said ground plane 15, but electrically insulated from said center conductor 16 by means of insulation 17. Concentrically positioned surrounding and outside of said outer conductor 18 is the braided coaxial shield 20, electrically insulated from said outer conductor 18 and said ground plane 15 by the shrink tubing insulation 19 completely surrounding said outer conductor 18 and positioned between said shield 20 and said outer conductor 18; thermistor 22 is mounted on ceramic insulation 24 with one lead electrically connected to outer conductor 18 through wire 21 and the other lead connected by wire 23a to the junction of the connection of resistors 26 and 27; said outer conductor 18 is electrically connected to the junction of the connection of capacitor 25 and resistor 27 through wire 23b; and said braided shield 20 is electrically connected to a metallic case surrounding the read-out and meter means (not shown), through shielded wire 23c (all with specific reference to FIG. 3 in addition FIG. 1).

In FIG. 3, switch 42 in the "OFF" position (position "1" of six position): both sides of meter 43 are shunted to common through decks "A" and "B" (of six decks), thereby providing mechanical damping of the meter movement to eliminate damage during storage or transporting; through decks "C" and "D," the positive and negative voltage sources (batteries 53 and 54 respectively) are open to prevent discharge during storage.

Switch 42 in the "BATTERY TEST" position (position "2"): deck "A" connects the positive side of meter 43 to common; deck "B" connects the negative side meter 43 to terminal "6" of the integrated circuit operational amplifier 29 through resistors 40 and 36; deck "C" connects the positive voltage supply (batter 53) to amplifier 29 positive (terminal "7"); deck "D" connects the negative voltage supply (battery 54) to amplifier 29 negative (terminal "4"); deck "F" connects the negative voltage supply (battery 54) to the probe assembly through resistor 52. In the "PROBE TEST" position the circuitry is designed to test probe components for either a short circuit or an open. An "OK PROBE TEST" zone on the scale of meter 43 indicates a non-defective probe. Readings above or below that zone indicate a defective probe. The operation of the circuit is as follows: a negative voltage is applied across the voltage divider formed by resistors 26, 27, and 52 and thermistor 22 in series parallel combination with the probe assembly; the value of resistor 52 is chosen such that the forward biased diode array 11a through 11h and resistors 14a through 14i will electrically load resistors 26 and 27 and thermistor 22 so that the voltage drop across them is a nominal pre-determined value serving as the signal voltage input for amplifier 29 though resistor 28. The output of amplifier 29 (terminal "6") powers the meter 43 throught resistors 36 and 40. A reading within the probe test zone on meter 43 is obtained if probe components are functional. If, however, any of the components or the wiring leading to the probe are "open," the signal voltage at the input of the amplifier 29 (terminal "3") will be significantly greater than the pre-determined value and will cause a "high" meter reading. If any of the components or the wiring leading to the probe are "shorted," the signal voltage will be significantly lower than the pre-determined value and a low meter reading will be obtained.

Switch 42 in the "100MW/CM$^2$" position (position "4"): through deck "A", the positive side of meter 43 is connected to the output of amplifier 29 (terminal "6") through the variable calibration resistor 39 and resistor 36; deck "B" connects the negative side of meter 43 to common which is the center of the series connection of batteries 53 and 54; deck "C" connects the positive voltage supply (battery 53) to amplifier 29 (terminal "7"); deck "D" connects the negative voltage supply (battery 54) to amplifier 29 (terminal "4"); deck "E" connects resistors 49 and 51 to provide forward bias and load to the diode array 11a through 11h; deck "F" provides the negative voltage for the resistor combination 49 and 51 of deck "E" and negative voltage for the diode network, resistors 46 and 32, which provides the offset comensation to the inverting input of amplifier 29 (terminal "2").

Variable resistor 30 is a "ZERO ADJUST" to balance out any output from amplifier 29 when no input signal is present.

Switch 42 in the "10 MW/CM$^2$" position (position "5"); circuitry is essentially identical to that in the "100 MW/CM$^2$" position, with the exception that resistor 51 is substituted for by resistor 50, resistor 49 is substituted for by resistor 47, resistor 46 is substituted for by resistor 44, and variable resistor 39 is substituted for by a variable resistor 38 to increase the overall sensitivity, thereby making 10 MW/CM$^2$ a full-scale reading on meter 43.

Switch 42 in the "2 MW/CM$^2$" position (position "6"): circuitry is essentially equivalent to that in the 10 MW/CM$^2$ position, with the exception that two resistors 48 and 45 are substituted for resistors 47 and 44 respectively, variable calibrating resistor 37 is substituted for variable resistor 38, and the path through a resistor to common is eliminated.

Switch 35 provides a "SLOW" and a "FAST" response time for integration of detected signal; with switch 35 in the "FAST" position, capacitor 34 is in parallel with resistor 31 and sets the time at which the reading on meter 43 reaches 90 percent of steady-state at approximately 1 second; with switch 35 in the "SLOW" position, capacitor 33, of a higher capacitance than capacitor 34, is in parallel with resistor 31 and sets the time at which the reading on meter 43 reaches 90 percent of steady-state at approximately 3 seconds (assuming the application of a steady-state microwave signal having a very short rise time analogous to a unit step input).

In all measuring positions ("100 MW/CM$^2$," "10MW/CM$^2$," and "2 MW/CM$^2$"), the probe assembly, by reason of the application of negative voltage supply (battery 54) via the center post of deck "F" of switch 42, is forward biased. This forward biased condition permits the diode array 11a through 11h to operate in nearly square law (that is, the signal is essentially linearly proportional to power density) at lower signal levels than would otherwise be possible.

The microwave sensing diode array 11a through 11h exhibits electrical characteristics which vary with ambient temperature. This is corrected for using thermistor 22 in a parallel/series configuration with resistor 26 and 27 to provide temperature compensation over a wide ambient temperature range.

Figure 2:
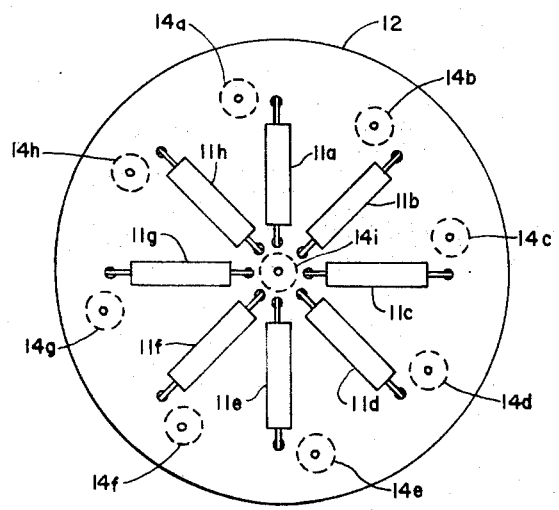
FIG. 2 is a head-on (detector-end) view depicting a radial array of diodes of the detection probe taken on line 2—2 of FIG. 1.

The configuration of the probe assembly with reference to FIG. 1 and the appropriate components in FIG. 2 and FIG. 3 has been depicted and described generally with reference to components 14a through 14i as "resistors." Although conventional resistors will perform reasonably adequately it has been shown in field performance of specific embodiments of the survey meter of this invention that the function resistors 14a through 14i (acting as microwave suppressors thereby isolating the diode array 11a through 11h from spurious signals picked up by any or all of the connecting leads) is effectively accomplished by the substitution of wire elements surrounded by ferrite material for said resistors thereby lowering the series resistance of the diode detector load loop and improving the dynamic range of the instrument.

In actual operative measuring on RF field, the meter function switch 42 is first passed through the "BATTERY TEST" and "PROBE TEST" positives, thereby automatically checking the response in each positive. Switch 42 is then placed in the "100 MW/CM$^2$" position and with the probe assembly remote from any RF field, meter 43 is zero adjusted with variable resistor 30 (meter calibration having been carried out previously following the procedure of H.E.W. Dept. Booklet BRH/DEP 70-16). The probe fitted with an appropriate microwave transparent spacing device is then introduced into the field and a preliminary reading taken to determine the appropriate level of sensitivity (100, 10, or 2 mw/cm$^2$). Having selected the sensitivity required, that range is set and the meter is again zeroed and the probe introduced into the field. Empirically, each diode and its series coupled resistor or ferrite element acts as an antenna, attenuator, and detector loop. The impinging RF field generates microwave currents in each such loop. The magnitude of that current is dependent on the amplitude and polarization of the impinging electric field and upon the orientation of the specific diode element with respect to that field, each diode being a foreshortened antenna which receives maximum currents when parallel to the electric field and lesser currents as it approaches a perpendicular direction to the field polarization. The alternating microwave current received by each opposing diode pair in effect yields full-wave rectification, one diode of the pair rectifying in the first half cycle and the other in the second half cycle. The advantage of utilizing a plurality of opposing diode pairs in a radial configuration, in addition to negating a need for specific antenna elements as herein described above, is that an accurate summation of the contribution from each diode pair into a single square law output is obtained. All diodes drive current through a single load resistor/capacitor combination. In the operation of a microwave survey meter of the present invention, it has been found that at least three opposing pairs of diodes are necessary to obtain satisfactory summation of incremental current or voltage data. Six diodes in a radial array at equal angles of 60° to one another provide a reasonable approximation of uniform summation over the entire plane. It has been found that eight diodes at 45° to one another are particularly advantageous. More than eight diodes, while yielding somewhat improved summation generally not justified on the basis of cost per incremental improvement.

The resistors or ferrite elements serve to suppress RF currents in all planes except that plane in which the diode array lies, thereby limiting detection to said plane.

At the relatively low power densities experienced in monitoring microwave leakage, diode operation is dependent on the slope and curvature of the voltage/current characteristics of the diode and its output is proportional to the power input, that is, the output voltage (or current) is proportional to the square of the input voltage (or current), ("square law"), provided the diode has optimum forward bias and has an optimized load resistance to give adequate dynamic range for square law operation.

Diode characteristics and operation are a function of ambient temperature. Although temperature compensation is not absolutely required for operation of a device of the present invention, it has been found to be highly desirable in maximizing consistency and accuracy of measurement. Conventional thermistor; resistor circuitry such as that depicted in FIG. 3 in the components thermistor 22 and resistors 26 and 27 have been found to provide satisfactory temperature compensation.

Since residual high frequencies may find their way through the detector loops or may be generated through unwanted RF pickup in the probe assembly, capacitor 25 is provided to bypass any residual high frequencies to common.

Once an optimally rectified, attenuated, compensated and filtered output signal from the probe assembly is delivered to the input of amplifier 29 (terminal "3") conventional amplification, integration, and readout are employed to yield a meter reading depicting microwave field strength directly in calibrated units of milliwatts per square centimeter.

From the foregoing description, it should be readily understood that the microwave survey meter of the present invention advantageously and in a unique manner provides a device to monitor microwave leakage from microwave appliances. Said device: is of a relatively inexpensive construction; is very advantageously rugged, mechanically and electrically, particularly with regard to probe burn-out or permanent impairment of calibration through exposure to such electric fields as might be expected to be encountered in normal use thereof; provides accurate near field microwave power density measurements over a broad range of field strengths and ambient temperatures; and is in full compliance with the requirements of the Department of Health, Education, and Welfare for a meter to monitor compliance with the recently promulgated performance standards for microwave ovens as regards power density limit for emitted microwave radiation.

A substantial latitude of modification, change, and substitution is intended in the foregoing disclosure, particularly in those areas of conventional electronic circuitry recognized as known art but utilized herein to accomplish the overall and result of the improvements and novel features hereof. It is to be understood that the examples, embodiments, and variations are merely illustrative of the present invention and numerous modifications will occur to those skilled in the art which fall within the scope of the invention.

What is claimed is:

1. A microwave survey meter to measure low level near-field microwave power density comprising:
   a radial array of semi-conductor diodes positioned in a single plane, each diode having first and second electrodes and having the first electrode of each diode connected directly to a common point, said radial array forming a microwave electric field strength detection probe wherein said radial array acts both as a detector and as an antenna, said detection being essentially independent of field polarization and said array causing a minimum perturbation to said field;
   means connected to the first and second electrodes to convert the output signal from said radial array of diodes from a current function to a voltage function;
   amplification and integration means responsive to the voltage function to amplify and integrate the voltage function; and
   display means responsive to the output of the amplification and integration means to provide an indication of the magnitude of said signal in units related to microwave power density.

2. The microwave survey meter of claim 1 wherein the radial array of diodes is electrically forward biased so as to provide diode operation within square law.

3. The microwave survey meter of claim 2 wherein the means to convert said output signal from said radial array of diodes comprises application of the dc current output from said radial array of diodes across a load resistance, the resulting voltage drop being a function of the impinging electric field strength.

4. The microwave survey meter of claim 1 wherein there is also provided a function switch sequencing means wherein prior to operation of the meter for the measurement of microwave fields it is necessary to pass from an off position through a battery check position and a probe check position before arriving at an operation position, thereby providing an essentially automatic check of the meters' readiness for operation.

5. A microwave electric free field strength detection probe comprising:
   an electrically forward biased radial array of semi-conductor diodes positioned in a single plane, each diode having first and second electrodes and having the first electrode of each diode connected directly to a common point;
   a load resistor means electrically connected between the first electrode of said radial array of semi-conductor diodes and a junction;
   microwave suppressing means connected between the second electrode of each diode and the junction to isolate the radial array of semi-conductor diodes from spurious RF signals picked up in a plane other than the plane of said radial array of semi-conductor diodes; and
   ambient temperature compensation means electrically connected across the first and second electrodes of said diode array;
   whereby a signal representative of microwave power may be obtained from across the load resistor means.

6. The microwave field detection probe of claim 5 wherein said microwave suppressing means are selected from the group consisting of resistors and wire elements surrounded by ferrite material and said ambient temperature combination.

* * * * *